US008067914B2

(12) United States Patent
Gifford et al.

(10) Patent No.: US 8,067,914 B2
(45) Date of Patent: Nov. 29, 2011

(54) MULTIZONE CAPACITIVE ANTI-PINCH SYSTEM

(75) Inventors: Carl Gifford, Picton (CA); Mirko Pribisic, North York (CA); Leslie Marentette, Newmarket (CA); Jan Majewski, Toronto (CA); Andrew R. Daniels, Sharon (CA); Thomas P. Frommer, Mount Albert (CA)

(73) Assignee: Intier Automotive Closures Inc, Newmarket, Ontario (CA)

( * ) Notice: Subject to any disclaimer, the term of this patent is extended or adjusted under 35 U.S.C. 154(b) by 198 days.

(21) Appl. No.: 12/316,043

(22) Filed: Dec. 9, 2008

(65) Prior Publication Data

US 2009/0322504 A1 Dec. 31, 2009

Related U.S. Application Data

(63) Continuation of application No. 10/494,251, filed as application No. PCT/CA02/01685 on Nov. 4, 2002, now abandoned.

(60) Provisional application No. 60/335,315, filed on Nov. 2, 2001.

(51) Int. Cl.
*H02P 3/02* (2006.01)

(52) U.S. Cl. .................................................... 318/466

(58) Field of Classification Search ........................ None
See application file for complete search history.

(56) References Cited

U.S. PATENT DOCUMENTS 3,651,389 A 3/1972 Ito et al.
3,805,149 A * 4/1974 Delapierre .................... 324/681
4,458,445 A 7/1984 Sauer et al.
5,621,290 A 4/1997 Heller et al.
5,714,853 A * 2/1998 Knab et al. .................... 318/265
5,912,625 A 6/1999 Scofield
6,002,228 A 12/1999 Knab
6,051,945 A 4/2000 Furukawa
6,114,820 A * 9/2000 Nishigaya ..................... 318/466
6,337,549 B1 * 1/2002 Bledin .......................... 318/466
6,347,482 B1 2/2002 Takiguchi et al.
6,366,042 B1 4/2002 Gerbetz
6,377,009 B1 * 4/2002 Philipp ......................... 318/468
6,389,752 B1 5/2002 Rosenau
6,452,514 B1 * 9/2002 Philipp ........................... 341/33

(Continued)

FOREIGN PATENT DOCUMENTS

DE 35 13 051 A1 4/1985

(Continued)

*Primary Examiner* — Elvin G Enad
*Assistant Examiner* — Robert W Horn
(74) *Attorney, Agent, or Firm* — Miller Canfield

(57) ABSTRACT

An anti-pinch assembly is used for a closure panel movable between open and closed positions on a motor vehicle. A controller operably connected to the closure panel controls operation thereof. A position sensor connected to the controller indicates the position of the closure panel between the open and closed positions. A capacitive sensor mounted on the vehicle and connected to the controller provides an output signal to the controller indicative of the presence of a foreign object in the path of the closure panel. The controller varies the function of the capacitive sensor through a plurality of threshold levels as a function of the position of the closure panel as indicated by the position indicator. In a critical zone of travel with the closure panel nearing the closed position, the capacitive sensor can be utilized in either a contact mode or a non-contact mode or a combination of both.

20 Claims, 2 Drawing Sheets

U.S. PATENT DOCUMENTS

| | | | | |
|---|---|---|---|---|
| 6,555,982 | B2 * | 4/2003 | Tyckowski | 318/465 |
| 6,573,677 | B2 * | 6/2003 | Gerbetz | 318/445 |
| 7,038,414 | B2 * | 5/2006 | Daniels et al. | 318/466 |
| 7,307,395 | B2 * | 12/2007 | Bouamra et al. | 318/445 |

FOREIGN PATENT DOCUMENTS

| | | | |
|---|---|---|---|
| DE | 40 04 353 | A1 | 2/1990 |
| DE | 40 36 465 | A1 | 11/1990 |
| EP | 0 856 425 | A1 | 1/1998 |

* cited by examiner

MULTIZONE CAPACITIVE ANTI-PINCH SYSTEM

This application is a continuation of U.S. application Ser. No. 10/494,251, filed Sep. 13, 2004, which claims priority to and all the benefits of International Application No. PCT/CA02/01685, filed Nov. 4, 2002, which claims priority to and all the benefits of U.S. Provisional Application No. 60/335,315, filed Nov. 2, 2001.

FIELD OF THE INVENTION

The invention relates to an anti-pinch system for a closure system associated with an aperture of a motor vehicle. More specifically, the invention relates to an anti-pinch system for an aperture of a motor vehicle wherein the anti-pinch system differentiates a number of zones.

DESCRIPTION OF THE RELATED ART

Motor vehicles typically have anti-pinch systems associated with powered closure assemblies used to selectively open and close an aperture. By way of example only, an aperture of a motor vehicle is found within a door or side and the closure panel associated therewith is a window and its associated control mechanism. A non-exhaustive list of closure assemblies includes door windows, sliding doors, liftgates, deck-lids, sunroofs and the like.

The anti-pinch systems associated with these closure assemblies typically sense the presence of a foreign object in the path of the closure panel by using characteristics such as motor current or a feedback device, such as a Hall effect sensor, position sensors, tachometer and the like. These feedback devices sense an abnormal characteristic in the parameter being sensed relative to the normal or unobstructed operating characteristic of the closure panel.

U.S. Pat. No. 6,051,945, issued to Furukawa on Apr. 18, 2000, discloses an anti-pinch assembly for a closure panel. A processor controls a motor that moves the windowpane between its open and closed positions. A Hall effect sensing device is positioned such that it can sense the velocity of the output shaft of the motor. To measure velocity, the Hall effect sensors are disposed around the shaft of the motor. A magnet is secured to the shaft and provides the magnetic field required sensed by the Hall effect sensors. Once the velocity of the shaft is measured, acceleration is derived and the force is calculated using the mass of the windowpane. This system requires the use of multiple sensors and calculations to determine the presence of an object.

Simple detection of obstructions based on motor speed or electrical current passing through the motor are inadequate due to the normally varying characteristics of these parameters through the full range of motion for the closure panel.

SUMMARY OF THE INVENTION

The disadvantages of the prior art may be overcome by providing an anti-pinch assembly that prevents objects from getting caught by a closure panel of a motor vehicle by providing an anti-pinch system having multiple zones of varying sensitivity.

According to one aspect of the invention, there is provided an anti-pinch assembly is used for a closure panel supported by the motor vehicle. The closure panel is movable between an open position and a closed position. A controller is operably connected to the closure panel for controlling the operation of the closure panel. A position sensor is connected to the controller for indicating the position of the closure panel as the closure panel moves between the open and closed positions. A capacitive sensor is mounted on the frame of the vehicle and connected to the controller for providing an output signal to the controller indicative of the presence of a foreign object in the path of the closure panel. The controller varies the function of the capacitive sensor through a plurality of threshold levels as a function of the position of the closure panel as indicated by the position indicator. In a critical zone of travel, namely, travel of the closure panel nearing the closed position, the capacitive sensor can be utilized in either a contact mode or a non-contact mode or a combination of both.

BRIEF DESCRIPTION OF THE DRAWINGS

Advantages of the invention will be readily appreciated as the same becomes better understood by reference to the following detailed description when considered in connection with the accompanying drawings, wherein.

DETAILED DESCRIPTION OF THE PREFERRED EMBODIMENTS

Figure 1:
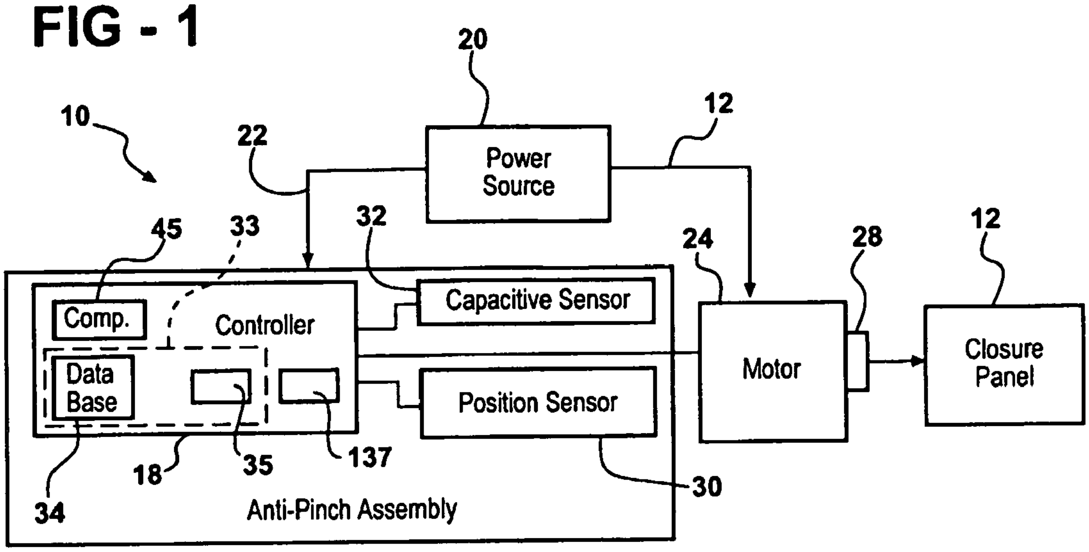
FIG. 1 is a schematic of one embodiment of the invention.

Referring to the Figures, an anti-pinch assembly is generally indicated at 10. The anti-pinch assembly 10 is used in conjunction with a closure panel assembly. The closure panel assembly includes of a closure panel 12, defining a leading edge 13, and its operating system, discussed subsequently. The closure panel 12 travels along a path between open and closed positions. The anti-pinch assembly 10 prevents the closure panel 12 from pinching or crushing an obstruction or object (not shown) that may be extending through an aperture 14 of a motor vehicle 16 (both shown in FIG. 2) when the closure panel 12 nears the closed position. It should be appreciated by those skilled in the art that the closure panel 12 may be any motorized or automated structure that moves between an open position and a closed position. By way of example, a non-exhaustive list of closure panels 12 include windowpanes, doors, liftgates, sunroofs and the like. Apertures include window frames, door openings, sunroof openings and the like. For purposes of simplicity, the remainder of this disclosure will focus on the windowpane and window frame combination.

The anti-pinch assembly 10 includes a controller 18. The controller 18 is electrically connected, directly or indirectly, to a power source 20. A conductor 22 graphically represents this connection. The power source 20 is preferably the power source 20 for the motor vehicle 16. The power source 20 may be a battery, a generator or any other electricity generating device or combination thereof.

A motor 24 receives electricity through a conductor 26 that, directly or indirectly, operatively extends between the power source 20 and the motor 24. The motor 24 rotates a shaft 28 operatively connected to the closure panel 12 in a conventional manner. The operative connection transforms the rotational energy into mechanical energy. More specifically, the electric output of the motor 24 into an opening and closing movement of the closure panel 12. The motor 24 optionally may be provided with separate motor controller. Operation of the motor 24 is effected by the motor controller.

A position sensor 30 is disposed adjacent the motor 24. The position sensor 30 identifies the position of the shaft 28 of the motor 24 and generates a position signal. By identifying the position of the shaft 28 upon receipt of the position signal, the controller 18 determines with specificity the position of the leading edge 13 of the closure panel, i.e., the windowpane 12. As the shaft 28 rotates, the position sensor 30 identifies where along the rotation the shaft 28 is as well as how many rotations the shaft 28 has executed. The degree of accuracy of the position sensor 30 is a variable that will depend on the specific design.

In one embodiment, the position sensor 30 is a Hall effect sensor that utilizes a single magnet (not shown) that is secured to the shaft 28. The magnet rotates with the shaft 28 and its magnetic field affects the position sensor 30 as it passes thereby.

In an alternative embodiment, the position sensor is a Hall effect sensor that is secured to a portion of the mechanism (not shown) that moves the windowpane between the open and closed positions. The position sensor 30 could be secured to a drive screw, glass run channel or some other portion of the mechanism that moves proportionally to the windowpane or closure panel 12.

A capacitive sensor 32 is mounted relative to the window frame in a spaced relation and electrically connected to the controller 18.

The capacitive sensor 32 is capable of determining changes in magnetic fields in the surrounding space due to the introduction of an object that has a dielectric that is different than that of the surrounding space. The capacitive sensor 32 can be turned to detect smaller changes in the surrounding space, i.e., when an object is extending through the window frame 40 but not touching the window frame 40, referred to as a non-contact mode. The capacitive sensor 32 detects changes in the surrounding space defined by the aperture 14 by measuring the capacitance of the capacitive sensor 32, discussed subsequently. Changes occur prior to the immediate closing of the closure panel 12 and when an object extends therethrough. An object extending through the aperture 14 will disrupt the dielectric fields being measured by the capacitive sensor 32 and the sensor 32 will responsively generate an output signal relative thereto.

The capacitive sensor 32 may also be used in a second mode, i.e., a contact mode. In the contact mode, the sensitivity of the capacitive sensor 32 is reduced. Therefore, a change in the dielectric field surrounding the capacitive sensor 32 triggers the anti-pinch assembly 10 only when the capacitive sensor 32 is moved by the object when it actually contacts the sensor 32 or the sealing system 37 that houses the sensor 32. The sensitivity of the sensor 32 is reduced so that the leading edge 13 of the closure panel 12 does not trigger the anti-pinch assembly 10, which would result in the closure panel 12 failing to reach its closed position ever.

Figure 4:
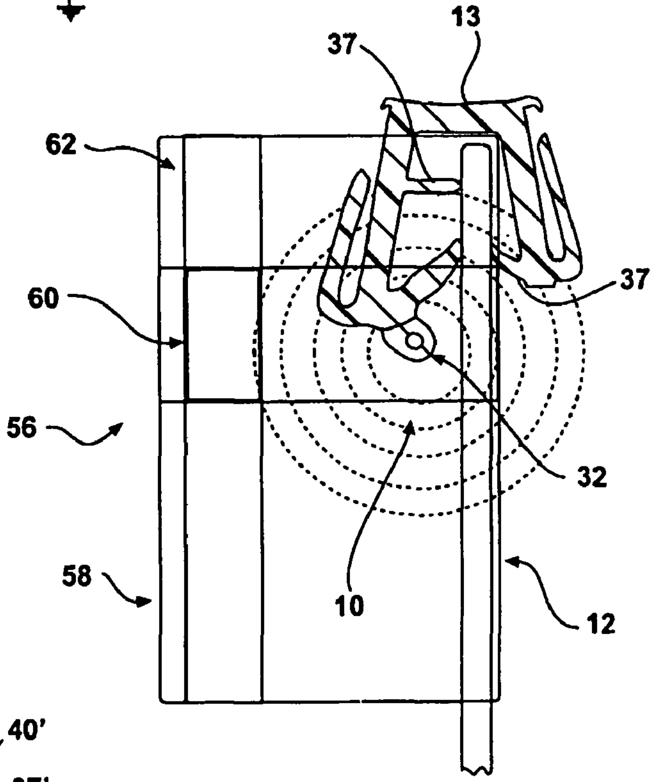
FIG. 4 is a cross section of a portion of an aperture and a window pane disposed adjacent a graphic representation of zones.

Referring to FIG. 4, the capacitive sensor 32 is molded into a flexible, and/or low durometer compound, in a range of less than 40-50 Shore. The compound is flexible and configured as the sealing system 37 of the aperture 14. Flexibility of the sealing system 37 can also be controlled by the cross-sectional configuration, including controlling thickness of the arm and walls supporting the capacitive sensor. In the embodiment shown in FIG. 4, the capacitive sensor 32 is molded directly into the sealing system 37.

Figure 5:
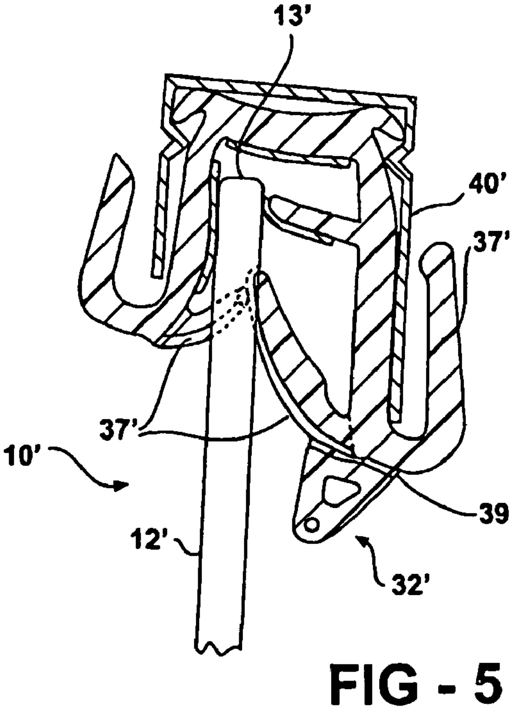
FIG. 5 is a cross section of graph of an aperture and a windowpane incorporating adhesive based sensor strips.

Referring to FIG. 5, wherein like primed numerals represent similar elements in an alternative embodiment, the capacitive sensor 32' may be added as an aftermarket item by using adhesive 39 to attach the capacitive sensor 32' to the sealing system 37'.

Figure 2:
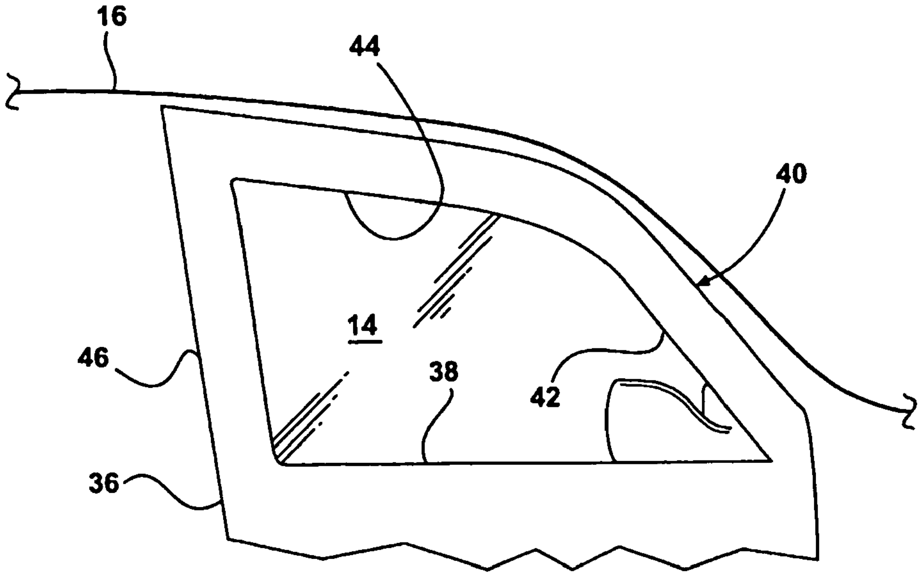
FIG. 2 is a side view of an aperture in a door of a motor vehicle incorporating one embodiment of the invention.
Figure 3:
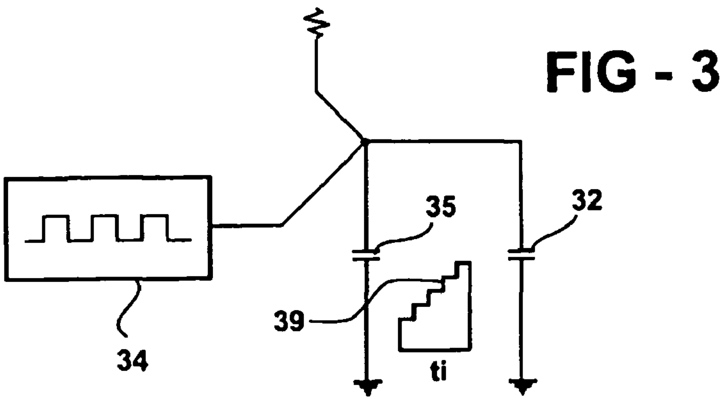
FIG. 3 is a schematic view of the driving circuit for the invention of FIG. 1.

Referring to FIG. 2, a door 36 of a motor vehicle 16 is shown. The door 36 defines the aperture 14 (a window frame in this case) as an opening extending between a base 38 of the door 36 and around a window frame 40 having a forward boundary 42, an upper boundary 44 and a rearward boundary 46. The capacitive sensor 32 extends along the forward 42 and upper 44 boundaries. The capacitive sensor 32 is designed to measure the electromagnetic field directly therebelow within the aperture 14.

The capacitive sensor 32 is preferably a long conductor that extends out from and along a window frame 40 at a predetermined distance from the window frame 40. The predetermined distance creates a specific capacitance for the capacitive sensor 32 because the capacitive sensor 32 uses the window frame 40 as ground. Any changes in the distance between the capacitive sensor 32 and the window frame 40 changes the capacitance in a manner far greater than when an object extends through the window frame 40 but does not touch the capacitive sensor 32. This change in capacitance is monitored by the controller 18. If an object, regardless of its dielectric constant, contacts the capacitive sensor 32 enough to flex it out of its position, the change is detected by the controller 18, which will subsequently stop and/or reverse the closure of the window.

The controller 18 includes a threshold generator 33 that generates a threshold value for the capacitive sensor 32. This threshold determines in which zone the anti-pinch assembly 10 is operating. The threshold is a value of a dielectric that the capacitive sensor 32 can detect. The threshold generator 33 includes a pulse generator 34 and a threshold capacitor 35. The threshold capacitor 35 is connected in parallel with the capacitive sensor 32 and is approximately 1000 times the capacitance of the capacitive sensor 32. The pulse generator 34 generates a regular pulse train of less than 5 volts, preferably 3-5 volts at a frequency of about 12 Mhz (200-500 ns per pulse), which signal is applied to the capacitive sensor 32. Since the capacitive sensor 32 is small in comparison with the threshold capacitor 35, the capacitive sensor 32 will become fully charged quickly. Once charged, the pulse train is reflected back to the threshold capacitor 35 thereby charging it in a stepped manner, graphically represented at 39, until the threshold capacitor 35 is fully charged. A counter 137 counts the number of pulses required to fully charge the threshold capacitor 35 and the count is placed in a floating memory. The capacitors 32, 35 are then discharged or reset and the process is re-started.

The count can be averaged over time so that the effects of weather and other extrinsic conditions can be factored out. A comparator 45 compares the counts of successive counts.

The determination of the presence of an obstacle is performed by monitoring the count. A measured signal is generated based on the monitored count. Any obstacle, whether it be a body part or otherwise, extending into the window aperture 14 or contacting the seal 44 will affect the dielectric constant of the field. The number of pulses required to fully charge the threshold capacitor 35 will increase should an object be present, resulting in an increased measured signal. If the change between a predetermined number of successive counts deviates or increases beyond a first predetermined threshold signal or count, the controller 18 determines that an object has extended through the window frame 40 or has moved the capacitive sensor 32 by touching or moving the sealing system 37.

When detection of an obstacle is made, the controller 18 then changes the motor signal being sent to the motor 24. The new motor control signal directs the motor 24 to either stop the closure panel 12 from moving or to reverse the direction in which the shaft 28 is rotating, retracting the closure panel 12. If the closure panel 12 is returned to its open position, the controller 18 normalizes the motor control signal and allows the motor 24 to operate according to normal operation. If the closure panel 12 remains in the same position, the anti-pinch assembly 10 will not allow the closure panel 12 to continue to its closed position until after the compare value is eliminated.

As noted previously, the motor may be provided with a separate motor controller having a position sensor. Thus, the motor controller will provide a position signal to the controller 18 and the controller 18 will send a motor control signal back to the motor controller.

Referring to FIG. 4, a graphic representation of multiple zones is generally shown at 56. The graph 56 shows each zone 58, 60, 62 as a function of position or location of the leading edge 13 of the windowpane 12. Each different zone 58, 60, 62 is contiguous with the next such that the leading edge 13 of the windowpane 12 can never in a position where controller 18 is not monitoring the capacitance of the capacitive sensor 32. Each of the zones 59, 60, 62 is a graphic representation for each of a plurality of threshold values above which the count must reach before the anti-pinch assembly 10 stops or reverses the windowpane 12.

In the lower or primary zone 58, the controller 18 increases the sensitivity of the capacitive sensor 32 to allow it to detect the presence of an object even when the object is low enough to avoid physically moving the capacitive sensor 32.

In the secondary zone 60, usually about 4 mm separating the upper edge 13 of the windowpane 12 from the sensor 32, the controller 18 decreases the sensitivity of the capacitive sensor 32. The position sensor 30 generates the position signal and the controller 18 responsively determines when the windowpane 12 enters the secondary zone 60.

In this zone of operation, the ability to detect an object is reduced. In other words, the controller 18 applies a second predetermined threshold that has a magnitude and/or duration greater than the first predetermined threshold.

The reduction in sensitivity allows the windowpane 12 to approach the capacitive sensor 32 without the controller 18 misidentifying the windowpane 12 as an object that might be pinched between the windowpane 12 and the window frame 40. As may be appreciated by those skilled in the art, a decrease of sensitivity still allows the capacitive sensor 32 to detect an object contacting it. Therefore, should an object remain in the path of the windowpane 12 as the upper edge 13 approaches the sealing system 37, the controller 18 will still be able to detect it and stop or retract the windowpane 12.

In the optional third or upper zone 62 of operation, the controller 18 deactivates the capacitive sensor 32. This allows the windowpane 12 to enter the sealing system 37 to properly seal against thereto. The capacitive sensor 32 is deactivated because, depending on the sealing system 37; the capacitive sensor 32 may move upon entry. If it were still active, it would inhibit the closing of the window or aperture 14. Upon the windowpane 12 being retracted, the controller 18 reverts to the reduced sensitivity mode (intermediate zone 60) and, subsequently, the higher sensitivity mode (lower zone 58). The anti-pinch assembly 10 will remain active until the windowpane 12 is returned to its closed position abutting the sealing system 37.

The invention has been described in an illustrative manner. It is to be understood that the terminology, which has been used, is intended to be in the nature of words of description rather than of limitation. Many modifications and variations of the invention are possible in light of the above teachings. Therefore, within the scope of the appended claims, the invention may be practiced other than as specifically described.

What is claimed:

1. An anti-pinch assembly for a closure panel of a motor vehicle having a closure frame and the closure panel is movable between open and closed positions along a path using a closure motor, said anti-pinch assembly comprising:

a controller;

a position sensor operably connected to said controller, said position sensor generating a position signal indicative of a position of the closure panel as the closure panel moves; and a capacitive sensor mounted on the motor vehicle and positioned to sense a capacitive field and operably connected to said controller to provide an output signal to said controller, said capacitive sensor operative to sense changes in the capacitive field resulting from an object extending between the closure frame and the closure panel and thereafter stops the closure panel from moving towards the closed position, wherein said controller operates said capacitive sensor at a plurality of threshold levels providing multiple sensitivity levels as a function of the position of the closure panel as indicated by said position sensor.

2. An anti-pinch assembly as claimed in claim 1 wherein said controller includes a threshold generator to alter said plurality of threshold levels upon changing ambient conditions.

3. An anti-pinch assembly as claimed in claim 2 wherein said threshold generator includes a threshold capacitor electrically connected to said controller in parallel with said capacitive sensor.

4. An anti-pinch assembly as claimed in claim 3 wherein said threshold generator further includes a pulse generator for generating a series of electrical pulses and for transmitting said series of electrical pulses to said capacitive sensor to charge same.

5. An anti-pinch assembly as claimed in claim 4 wherein said threshold generator includes a counter operably connected to said pulse generator to count each of said series of electrical pulses.

6. An anti-pinch assembly as claimed in claim 5 wherein said position sensor is disposed adjacent the closure panel to identify the position of the closure panel.

7. An anti-pinch assembly as claimed in claim 5 where said position sensor is disposed adjacent the closure motor.

8. An anti-pinch assembly as claimed in claim 7 wherein said position sensor is a Hall effect sensor.

9. An anti-pinch assembly as claimed in claim 8 wherein said capacitive sensor extends along a portion of the closure frame.

10. An anti-pinch assembly as claimed in claim 9 wherein said capacitive sensor is fabricated from an elongated conductor.

11. An anti-pinch assembly as claimed in claim 1 wherein said controller varies the function of the capacitive sensor through a plurality of threshold levels as a function of the position of the closure panel as indicated by the position indicator.

12. An anti-pinch assembly as claimed in claim 1 wherein said capacitive sensor operates in a contact mode, a non-contact mode or a combination of both.

13. A method for detecting the presence of an obstacle in a path of a closure panel movable by a motor between an open position and a closed position using a position sensor, a capacitive sensor, a threshold capacitor and a pulse generator, the method comprising the steps of:

generating a threshold signal corresponding to a plurality of threshold levels providing multiple sensitivity levels as a function of the position of the closure of the panel;

measuring the dielectric in a field extending in the path of the closure panel to generate a measured signal;

comparing the measured signal with the threshold signal as a function of the panel position; and stopping the closure panel from moving towards the closed position when the measured signal exceeds the threshold signal.

14. A method as claimed in claim 13 wherein the step of generating a threshold signal includes the step of producing a pulsed signal.

15. A method as claimed in claim 14 including the step of counting the pulses in the pulsed signal to create a pulse count.

16. A method as claimed in claim 15 including the step of comparing the pulse count to the threshold signal.

17. A method as claimed in claim 16 wherein the step of stopping the closure panel occurs when the pulse count exceeds the threshold signal.

18. A method as claimed in claim 17 including the step of using the capacitive sensor to generate the measured signal.

19. A method as claimed in claim 18 including the step of using the threshold capacitor to generate the threshold signal.

20. An anti-pinch assembly for a closure panel of a motor vehicle having a closure frame and the closure panel is movable between open and closed positions along a path including first, second and third zones using a closure motor, said anti-pinch assembly comprising:

a controller;

a position sensor operably connected to said controller, said position sensor generating a position signal indicative of a position of the closure panel as the closure panel moves; and a capacitive sensor mounted on the motor vehicle and positioned to sense a capacitive field and operably connected to said controller to provide an output signal to said controller, said capacitive sensor operative to sense changes in the capacitive field resulting from an object extending between the closure frame and the closure panel and thereafter stops the closure panel from moving towards the closed position, wherein said controller operates said capacitive sensor at a first threshold level when the closure panel is in the first zone extending from the open position to the second zone, and wherein said controller operates said capacitive sensor at a second threshold level, having a decreased sensitivity relative to said first threshold level, when the closure panel is in the second zone extending from the first zone to the third zone, and wherein said controller deactivates said capacitive sensor when the closure panel is in the third zone extending from the second zone to the closed position.

* * * * *